(12) United States Patent
Smith

(10) Patent No.: US 12,369,755 B2
(45) Date of Patent: Jul. 29, 2025

(54) ROASTING TOOL

(71) Applicant: Jeffrey J. Smith, Weedsport, NY (US)

(72) Inventor: Jeffrey J. Smith, Weedsport, NY (US)

( * ) Notice: Subject to any disclaimer, the term of this patent is extended or adjusted under 35 U.S.C. 154(b) by 780 days.

(21) Appl. No.: 17/670,983

(22) Filed: Feb. 14, 2022

(65) Prior Publication Data
US 2022/0265093 A1 Aug. 25, 2022

Related U.S. Application Data

(60) Provisional application No. 63/152,539, filed on Feb. 23, 2021.

(51) Int. Cl.
*A47J 43/18* (2006.01)
*A47J 37/04* (2006.01)

(52) U.S. Cl.
CPC ............. *A47J 43/18* (2013.01); *A47J 37/049* (2013.01)

(58) Field of Classification Search
CPC ......... A47J 43/18; A47J 37/049; A47J 33/00; A47J 37/0786; A47J 2037/0795; A47J 37/043; A47J 37/04; A47J 43/288; A47J 45/00; A47J 43/28; A47J 2201/00; A47J 37/0694; A47J 43/283; A47J 37/0745; A47J 37/041; A47J 37/0763
USPC ........ 99/421 A, 421 R, 421 H, 421 HV, 419, 99/394
See application file for complete search history.

(56) References Cited

U.S. PATENT DOCUMENTS

| | | | |
|---|---|---|---|
| 2,522,223 A | 6/1946 | Hardin | |
| 3,387,555 A | 6/1968 | Moran | |
| 4,126,086 A | 11/1978 | Valade | |
| 6,234,162 B1 | 4/2001 | Wenker | |
| 2015/0110939 A1 | 4/2015 | Benson et al. | |
| 2016/0045065 A1* | 2/2016 | Pribyl | A47J 37/043 |
| | | | 426/523 |
| 2016/0174760 A1* | 6/2016 | Criner | A47J 33/00 |
| | | | 99/421 A |
| 2019/0343332 A1 | 11/2019 | Criner | |

FOREIGN PATENT DOCUMENTS

FR 2712478 B1 6/1996

* cited by examiner

*Primary Examiner* — Phuong T Nguyen
(74) *Attorney, Agent, or Firm* — Bernhard P. Molldrem, Jr.

(57) ABSTRACT

A portable roasting tool is configured to hold a quantity of sausages or other food items over a campfire or similar fire. The tool has a hollow tubular main handle with an extendible rod that slides out from it and has a meat holder, at its distal end. A swing-down articulated support leg pivots so it can clamp to the handle for travel or storage, and open down to ground to support the tool at its middle. A rotary bearing at allows the main handle and fork to be turned by hand to rotate the meat holder. The tool can be angled up or down to position the meat relative to the campfire or coals.

8 Claims, 3 Drawing Sheets

ROASTING TOOL

This application claims priority under 35 U.S.C. 113(e) of my U.S. Provisional Patent Application Ser. No. 63/152,539, filed Feb. 23, 2021, the specification, abstract and claims of which are incorporated by reference herein.

BACKGROUND OF THE INVENTION

The present invention is directed to a portable roasting stick or rod for holding a quantity of sausages (e.g. hot dogs) chicken parts, marshmallows or other food items over a campfire or similar fire, e.g., at a fundraiser picnic for a boy scout or girl scout troop, or another volunteer or non-profit organization.

The tool has a hollow tubular main handle that is about four feet in length and an extendible rod that slides out from it and has a meat holder, e.g., fork, at the distal end. The rod can be either a solid rod or a tube that can telescope out from the main handle. The rod in the later case may be a tube-in-tube arrangement where an inner tubular member can telescope out from an outer tubular member, which can result in a longer extension from the main handle. The roasting tool's meat holder, in a preferred embodiment, is configured with four tines, each about four inches long so that each pair of tines can hold a quantity or stack of hot dogs, sausages, chicken parts, etc. There is also a swing-down articulated support leg that pivots so it can clamp to the tubular handle for travel or storage, and open down to support the tool at about its middle from the ground. There is a rotary bearing at that point (connecting the main handle and the articulated support leg) so the handle and fork can be turned by hand to rotate the meat holder fork. The tool can be pitched up or down also to adjust the position the meat is held at relative to the campfire or coals. The tubular rod pulls out, i.e. telescopes, so its length is adjustable, but the tubular rod does not rotate relative to the tubular main handle.

The main handle is swaged, i.e., belled somewhat, at its distal end and the tubular (or solid) rod that extends from it is flared at its proximal end to allow for telescoping action. The support leg in a preferred embodiment is a rigid member of a fixed length, but in some cases the support leg may telescope out or in to accommodate different heights, as need be.

The roasting tool is favorably made of stainless steel, which does not conduct heat well so the handle stays cool. Also, the fork at the distal end of the rod could just as well be configured differently, although the straight-across configuration as shown is easier to pack up and carry than a more complex shape. The tool may also be provided with interchangeable roasting heads to adapt the roasting tool for different purposes. The main handle may be knurled or textured for better gripping.

DESCRIPTION OF THE PREFERRED EMBODIMENT

Figure 1:
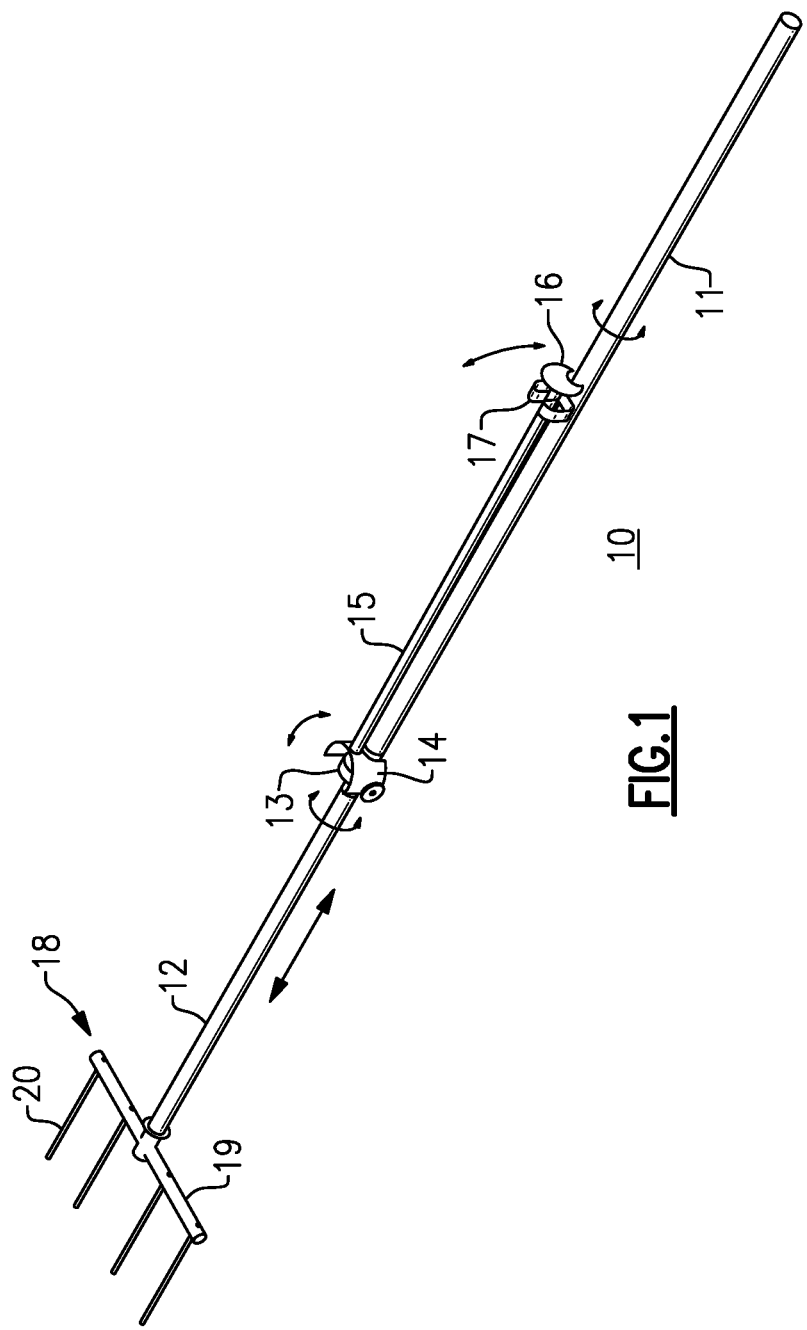
FIG. 1 is a perspective view showing the tool and its various components, here with the support leg folded up against the handle of the tool
Figure 2:
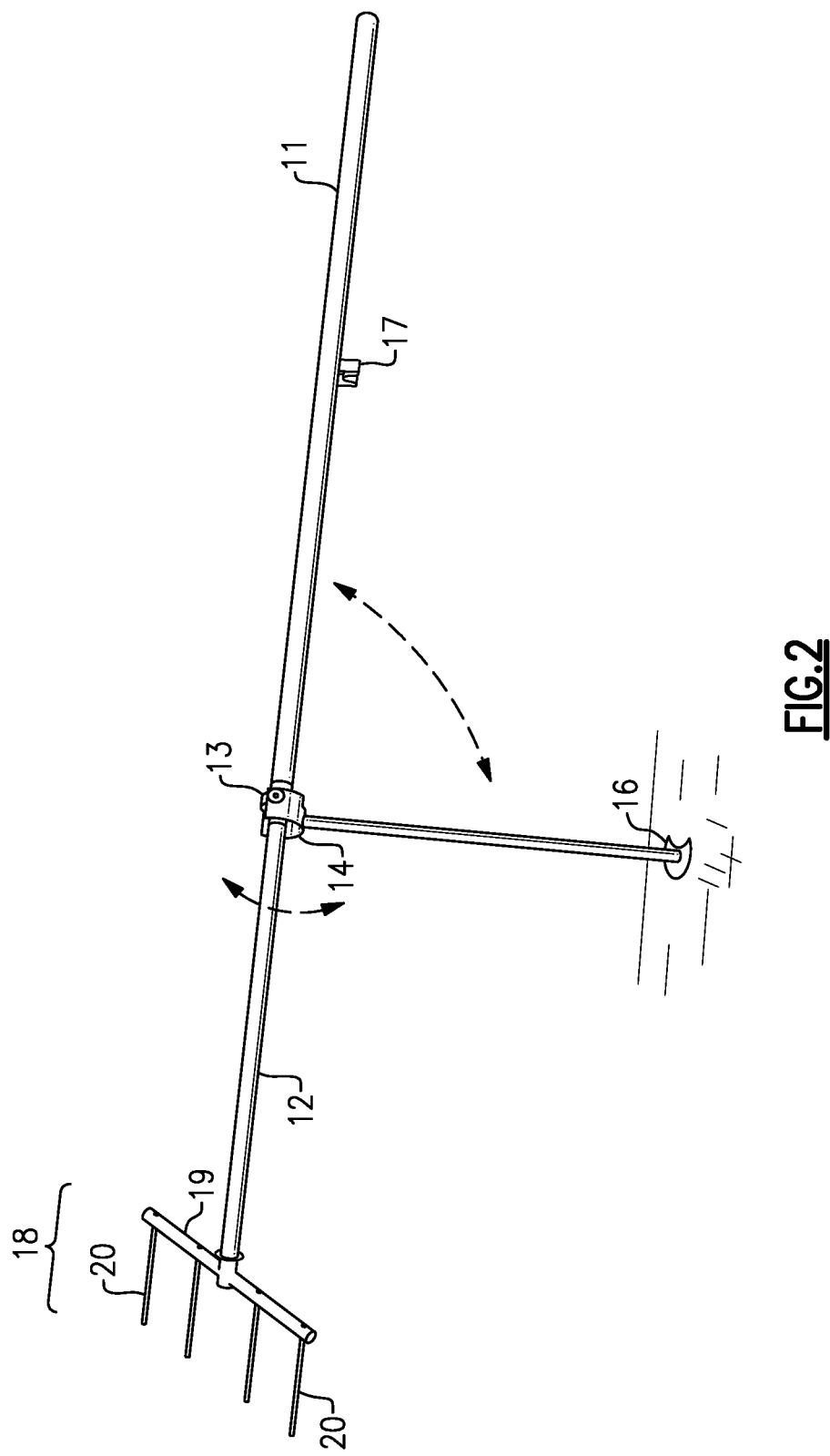
FIG. 2 is a similar view with the support leg swung down for supporting the tool above a ground surface.

An embodiment of the roasting tool of my invention is shown in the Drawing Figures, beginning with FIGS. 1 and 2. Here the roasting tool 10 is in the form of an extendible roasting fork useful for roasting meat over an open fire e.g. at a picnic or summer festival or fair. The tool 10 is formed of a tubular metal main handle 11 formed, e.g. of stainless steel so as to be durable with a low heat conductivity so the handle will stay relatively cool, and a rod 12 that slides proximally-distally into and out of the distal end of the tubular handle, and can be locked or set in position. The proximal end 11A (FIGS. 3, 4) of the main handle 11 can be knurled or otherwise textured to assist in gripping. The rod 12 may be keyed or splined so that it does not rotate with respect to the handle. This limits action of the rod 12 to in-and-out motion in respect to handle 11. Preferably the rod 12 is a stainless steel tubular member that can telescope distally out from within the main handle 11. A rotary bearing 13 is placed at the distal end of the handle, and a swivel member 14 is pivotally mounted on the rotary bearing. A support leg 15, e.g., a durable metal rod, is affixed to the swivel member 14, so that the support leg 15 can be swung out for use and swung in against the handle 11 for storage. There is a footing plate 16 at the free end of the support leg 15. A spring clamp 17 holds the support leg 15 removably against the main handle 11. The footing plate may favorably have a lunette shape, to allow for folding down the support leg 15 against the main handle 11. The distal end of the rod supports a meat holder or roasting fork 18, here formed as a transverse member 19 that is attached at its center to the distal end of the rod 12, The roasting fork has a set of tines 20 that extend forward from the transverse member 19.

Figure 3:
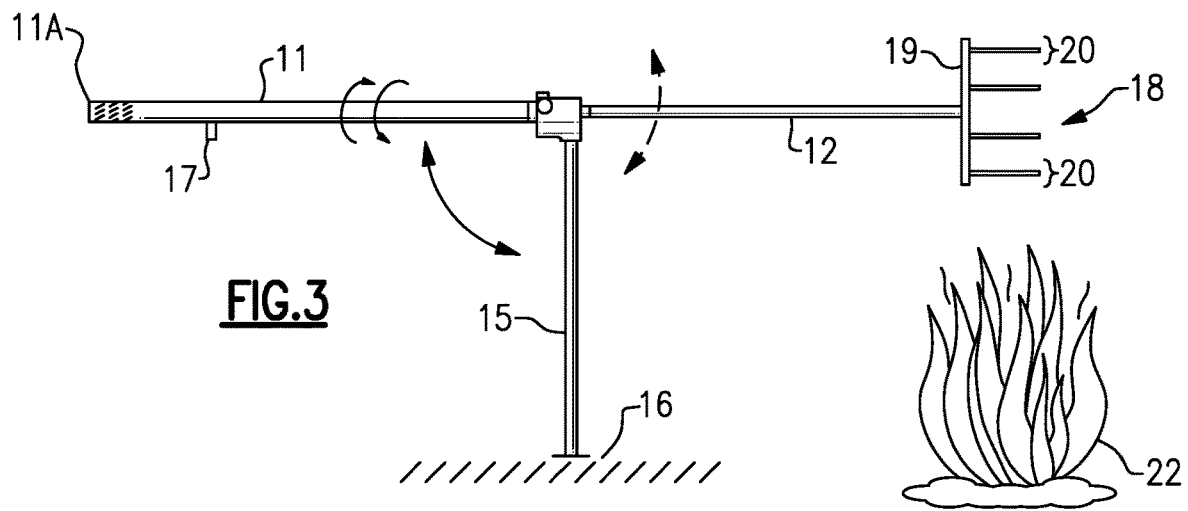
FIG. 3 is a general side elevation thereof, for explaining the operation of the device.
Figure 4:
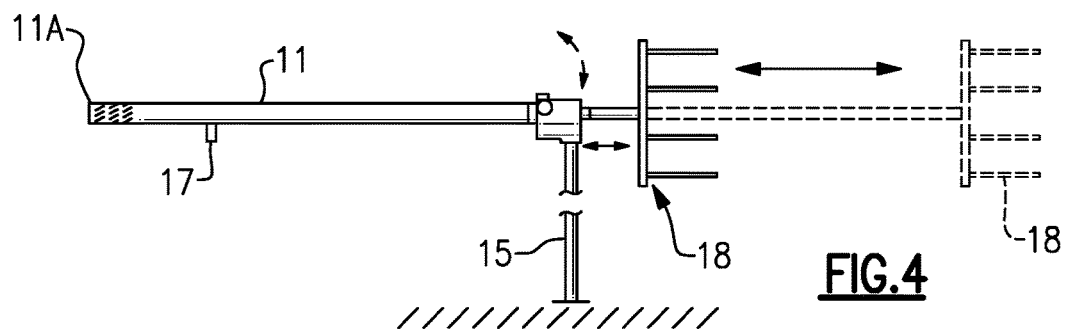
FIG. 4 is another side elevation illustrating the relative movement of the rod and fork or head relative to the handle.

As shown in FIG. 2, when in use, the support leg 15 is set out at a suitable angle, here nearly a right angle, so that the footing plate 16 rests on the ground when the tool is approximately horizontal. The ground can be level or sloped. The tool can be rotated about the axis of the main handle 11 and rod 12, and the tool may also be rotated up and down at the pivot or swivel 14, permitting the position of the fork 18 to be moved as need be for heating the food over a campfire or other equivalent heat source fire 22 (FIG. 3), which may be flame or coals. This gives the user or operator full control over the angle of the roasting tool to raise, lower, or rotate the fork 18 or to swing it to right or left to place the meat on the fork, e.g., 18 at an optimal place over a campfire 22 for cooking. There are degrees of freedom in the pitch, yaw and roll directions (as indicated in FIG. 3), as well as a freedom of movement fore and aft for extending or retracting the rod relative to the handle, as perhaps best illustrated in FIG. 4. Favorably, the rod can be locked into the desired extended position.

Figure 5:
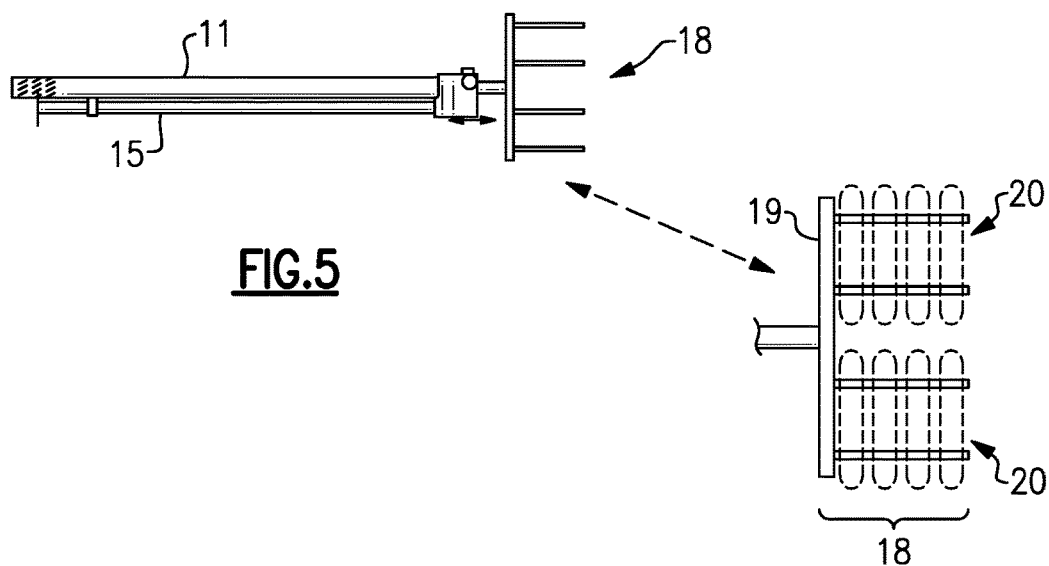
FIG. 5 shows the device folded down compactly for storage or travel

FIG. 5 shows the roasting tool compacted and folded down for transport and/or storage. In this position, the rod 12 collapses back into the tubular main handle 11, and the support leg 15 is rotated against the handle 10 and held in place by the clamp 17. In this condition, the entire tool may be fitted into a soft storage case or pack (not shown).

Figure 6:
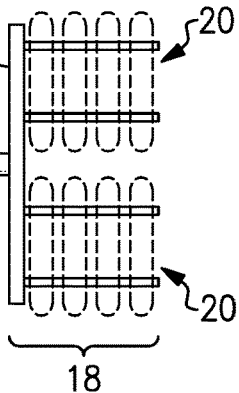
FIG. 6 illustrates the packing of meat products onto the fork or head.

An enlargement of the fork head 18 appears in FIG. 6, wherein two stacks of sausages, shown in broken line, can be held on each of the two pairs of tines 20, each stack containing four sausages, Alternatively, chicken breasts or other chicken pieces can be stacked together in this fashion, or other pieces of meat, placed upon the tines 20. Then the meat on the fork or head can be moved to an optimum position over the campfire or other heat source, and rotated as need be, until properly cooked.

Other types of meat holders can be installed on the rod in place of the fork 18, such as a meat basket, or one or more transverse skewers. Cooking heads and meat baskets for these purposes may take on any well known form. The roasting fork may be permanently affixed onto the distal end of the rod, or a variety of meat holders may be provided, and interchangeable with a removably attached roasting fork.

In other possible implementations, the main handle 11 may be provided with a tough technical plastic cover capable or withstanding the heat of a campfire or bonfire, and providing some insulation for the gripping portion of the main handle. Various lock mechanisms may be provided for keeping rod 12 at a given extended position, which may be as desired anywhere between a partially extended and a fully extended position. A multiple-tube configuration of the rod 12 may be extendible out to a longer distance from the main handle.

While this invention has been illustrated by reference to a preferred embodiment, many other meat roasting tools can be produced without departing from the scope and spirit of this invention.

What is claimed is:

1. A roasting tool configured for cooking a meat product over an open fire comprising
   an elongated hollow tubular main handle;
   a rod extending distally out of said main handle and movable fore and aft from and into the handle, but rotatably locked in respect to the main handle;
   a meat holding arrangement at a distal end of the rod;
   a rotary bearing mounted at the distal end of said handle permitting the handle and rod to be rotated, but the handle not being movable axially relative to said rotary bearing, with a pivot configured for pivoting in respect to said main handle on a transverse axis of said rotary bearing; and
   a support leg held on the pivot and configured to swing out from said main handle and adapted to rest upon a horizontal surface and to support the main handle and rod above said horizontal surface.

2. The roasting tool of claim 1 wherein said main handle includes a tube of a low-heat-conductance stainless steel.

3. The roasting tool of claim 1 wherein said rod is lockable into fully extended and partially extended positions.

4. The roasting tool of claim 1 further comprising a spring clamp affixed on said handle and configured for releasably holding said support leg when said support leg is folded up against the handle.

5. The roasting tool of claim 1 wherein said main handle has a knurled surface at least at a proximal portion thereof.

6. The roasting tool of claim 1 wherein said support leg is an articulating support leg.

7. The roasting tool of claim 1 wherein said meat holding arrangement includes a transverse member that is attached at its center to the distal end of the rod, and a multiplicity of at least four tines that extend distally from said transverse member.

8. The roasting tool of claim 7 wherein said transverse member is removably attached to the distal end of said rod.

\* \* \* \* \*